(12) United States Patent
Venugopal et al.

(10) Patent No.: US 11,589,115 B2
(45) Date of Patent: Feb. 21, 2023

(54) PARENTAL CONTROLS FOR CONTENT

(71) Applicant: AT&T Intellectual Property I, L.P., Atlanta, GA (US)

(72) Inventors: Megha Venugopal, Union City, CA (US); Binny Asarikuniyil, Cerritos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/194,126

(22) Filed: Mar. 5, 2021

(65) Prior Publication Data

US 2022/0286742 A1 Sep. 8, 2022

(51) Int. Cl.
*H04N 21/454* (2011.01)
*H04N 21/466* (2011.01)

(52) U.S. Cl.
CPC ....... *H04N 21/454* (2013.01); *H04N 21/4662* (2013.01)

(58) Field of Classification Search
None
See application file for complete search history.

(56) References Cited

U.S. PATENT DOCUMENTS

| | | | | |
|---|---|---|---|---|
| 2002/0147782 | A1* | 10/2002 | Dimitrova | H04N 21/4394 709/207 |
| 2004/0187160 | A1* | 9/2004 | Cook | H04N 7/17336 725/94 |
| 2006/0130119 | A1 | 6/2006 | Candelore | |
| 2007/0204288 | A1* | 8/2007 | Candelore | H04N 21/4542 725/28 |
| 2007/0258696 | A1 | 11/2007 | Branson | |
| 2013/0166580 | A1 | 6/2013 | Maharajh | |
| 2013/0297706 | A1* | 11/2013 | Arme | H04N 5/765 709/206 |
| 2015/0067709 | A1* | 3/2015 | Meredith | H04N 21/44218 725/12 |
| 2016/0080510 | A1* | 3/2016 | Dawoud Shenouda Dawoud | H04N 21/4223 709/225 |
| 2017/0223414 | A1* | 8/2017 | Debickes | H04N 21/4532 |
| 2019/0022533 | A1* | 1/2019 | Asanuma | H04N 21/4751 |
| 2019/0098360 | A1* | 3/2019 | Keeney | H04N 21/4398 |
| 2020/0092610 | A1* | 3/2020 | Baughman | H04N 21/4532 |

OTHER PUBLICATIONS

Asarikuniyil, et al., "Content Filtering System Based on Improved Content Classification," U.S. Appl. No. 17/320,095, filed May 13, 2021.

\* cited by examiner

*Primary Examiner* — Junior O Mendoza

(57) ABSTRACT

An example method includes receiving a selection of a media content, applying customized parental control rules associated with a user to the media content, providing a notification to apply a parental control associated with the customized parental control rules to the media content, receiving a confirmation to apply the parental control, and controlling the media content in accordance with the parental control that is applied.

20 Claims, 4 Drawing Sheets

PARENTAL CONTROLS FOR CONTENT

The present disclosure relates generally to parental controls for media content, and relates more particularly to devices, non-transitory computer-readable media, and methods for automatically providing a parental control for content based on previous actions.

BACKGROUND

Content may have general descriptions of what may be included in the content. For example, content may have rating that suggests appropriate age groups to view the content. In addition, content may have general and broad descriptions associated with the rating, such as language, violence, and the like. However, content with the same ratings and similar descriptions may still be very different. Such lack of granularity does not allow for effective parental control for content access.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
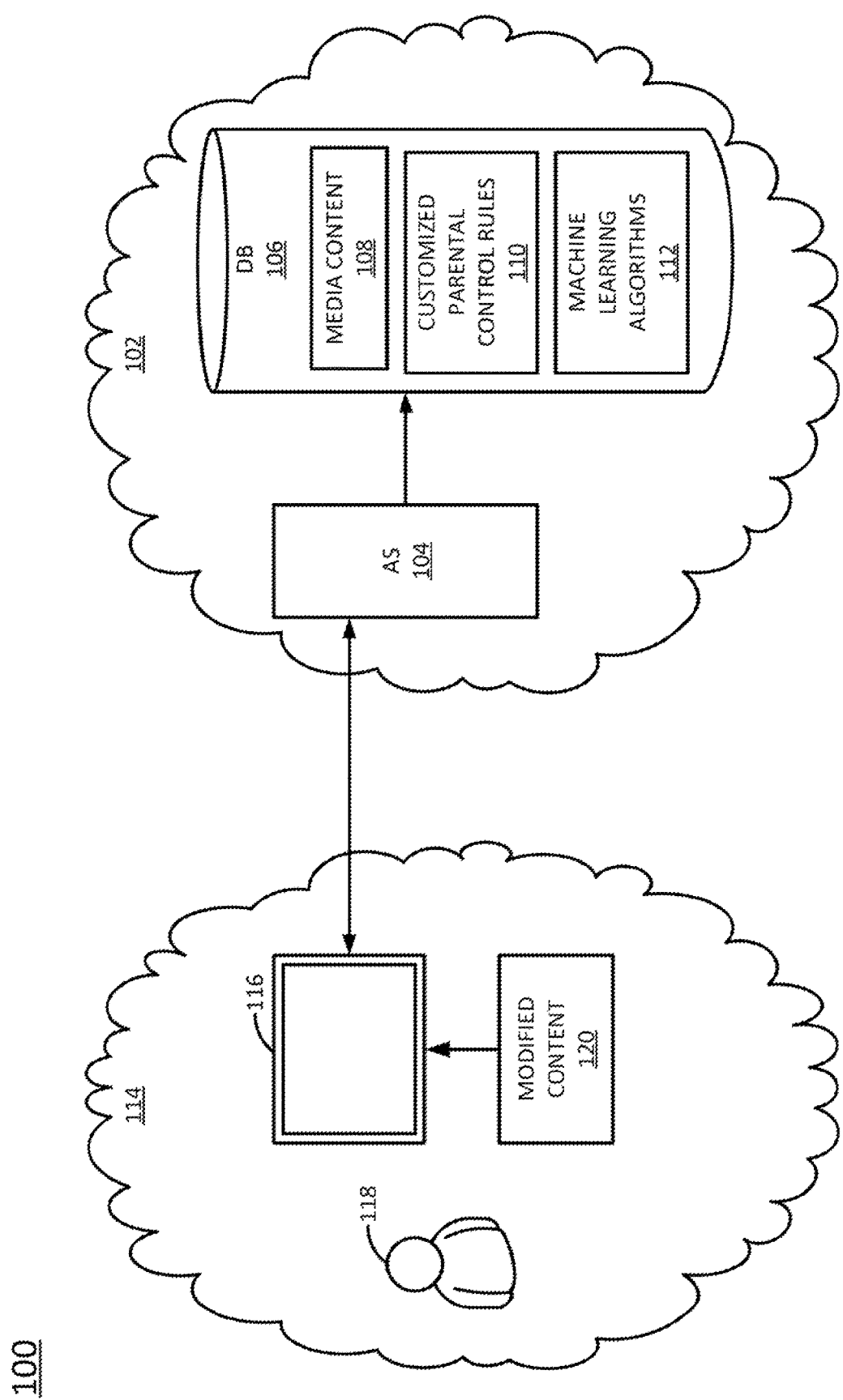
FIG. 1 illustrates an example system in which examples of the present disclosure for providing automated parental controls on content can be deployed.

The present disclosure broadly discloses methods, computer-readable media, and systems for providing automated parental controls on content. In one example, a method performed by a processing system includes receiving a selection of a media content, applying customized parental control rules associated with a user to the media content, providing a notification to apply a parental control associated with the customized parental control rules to the media content, receiving a confirmation to apply the parental control, and controlling the media content in accordance with the parental control that is applied.

In another example, a non-transitory computer-readable medium may store instructions which, when executed by a processing system in a communications network, cause the processing system to perform operations. The operations may include receiving a selection of a media content, applying customized parental control rules associated with a user to the media content, providing a notification to apply a parental control associated with the customized parental control rules to the media content, receiving a confirmation to apply the parental control, and controlling the media content in accordance with the parental control that is applied.

In another example, a device may include a processing system including at least one processor and non-transitory computer-readable medium storing instructions which, when executed by the processing system when deployed in a communications network, cause the processing system to perform operations. The operations may include receiving a selection of a media content, applying customized parental control rules associated with a user to the media content, providing a notification to apply a parental control associated with the customized parental control rules to the media content, receiving a confirmation to apply the parental control, and controlling the media content in accordance with the parental control that is applied.

As discussed above, content may have broad and general descriptions of what may be included in the content. For example, content may have a rating (e.g., NC-17, R, PG-13, PG, and G) that suggests appropriate age groups to view the content. In addition, content may have general descriptions associated with the rating, such as language, violence, substances, and the like. However, content with the same ratings and similar descriptions may still be very different. Such lack of granularity does not allow for effective parental control for content access, thereby leading to over-inclusive parental control (e.g., limiting children access to content that may in fact be acceptable to the parents) or under-inclusive parental control (e.g., allowing children access to content that may in fact be unacceptable to the parents).

For example, two movies may have a similar rating for language and mild violence. The first movie may include gun violence where the second movie may include punching and kicking. With currently available filters, both movies may be filtered or allowed based on the same rating, e.g., violence. However, in this example the parent may actually allow their children to watch punching and kicking scenes, but not allow their children to watch gun violence scenes that may include some blood from victims of the gun violence.

In another example, a scene in the first movie may include a suggestive scene where a person is in a towel. Although this type of scene may have no effect on the rating of the movie, the parent may not want their children to see such types of suggestive scenes.

In addition, the ratings may include general descriptions of content within the movie. For example, a PG-13 rating may include descriptors such as "violence" and "language." However, these broad categories may include several different types of violence and a broad spectrum of language. A parent may allow their children to watch sword fighting, but not allow their children to watch gun fighting. A parent may allow their children to watch a gun fight scene as long as the scenes do not show blood or a person actually being shot. A parent may be more sensitive to the language their children may hear. For example, some derogatory language or some terms may not be considered profanity in today's culture. As a result, these terms may not be included in the category of "language" when rating a movie, thereby potentially exposing children to language that the parents may actually deem to be inappropriate.

As a result, when watching a movie for a first time, the parents may be surprised when a scene appears in a movie given what they believed the movie content would include based on the rating and general descriptions. The present disclosure provides customized parental control rules that may apply a parental control to an entire movie or to scenes within a movie.

For example, a machine learning algorithm may be used to create the customized parental control rules. For example, a database of media content may be tagged and labeled. Each scene of the media content (e.g., a movie, a television show, music, and the like) may be tagged by a service provider. During a training period, the inputs of a user may be tracked based on the tags associated with each scene of the media content that is consumed by the user. For example, each time a user fast forwards a scene, the machine learning algorithm may note the input and the tags or labels associated with the scene of the media content that were skipped. After the training period is completed, the customized parental control rules may be generated for that particular user.

The customized parental control rules may be applied to subsequent content that is selected by the user. In one embodiment, the customized parental control rules may prevent access to selected media content even though the rating and description may appear to be acceptable to the user. In one embodiment, the customized parental control rules may automatically modify the media content to transmit a custom modified media content to the user. For example, the undesirable scenes based on the customized parental control rules may be removed to modify the media content for the user prior to transmission and/or presentation of the media content.

In one embodiment, a parental control associated with the customized parental control rules may be applied during playback of the media content. For example, customized parent control rules may detect a scene that includes images that are to be blocked. The media content may be paused and a notification may ask a user if they would like to skip a scene. The user may confirm the parental control and the scene may be automatically skipped, or alternatively, the user may decline the parental control and the scene may be presented.

In one embodiment, as the user continues to consume media content and provide inputs, the customized parental control rules may be updated continuously as children age and parental rules change over time. As a result, the present disclosure may provide customized parental controls for media content that allows more granular control and automated execution of the parental control.

To better understand the present disclosure, FIG. 1 illustrates an example network 100, related to the present disclosure. As shown in FIG. 1, the network 100 may include a core network 102 and a home network 114. The core network 102 may be a service provider network that may provide communication services and content services (e.g., streaming media, Internet television, and the like).

In one embodiment, the core network 102 may include an application server (AS) 104 and a database (DB) 106. The AS 104 may comprise a processing system (e.g., a processor and a memory storing instructions) that may execute the functions described herein. The AS 104 may be communicatively coupled to the DB 106. The DB 106 may store various information and/or data such as media content 108, customized parental control rules 110, and one or more machine learning algorithms 112. The AS 104 may access the media content 108, the customized parental control rules 110, and the machine learning algorithms 112 for processing and/or execution of the instructions stored in the DB 106. The DB 106 may also store other types of information that is not shown in FIG. 1. For example, the DB 106 may include account information, customer demographic information (e.g., members of the customer's household in terms of age, gender, and the like), account profiles, billing information, and the like.

In one embodiment, the media content 108 may include various types of content that can be accessed by a user 118 to be consumed on an endpoint device 116 in the home network 114. The media content 108 may include movies (e.g., having both image content and audio content), television shows, photo albums (e.g., having image content only), songs (e.g., having audio content only), and the like.

In one embodiment, the customized parental control rules 110 may store generated rules that are applied to the media content 108. Each user 118 may have customized parental control rules 110 that can control media content 108 differently from other users. The customized parental control rules 110 may be generated during a training time period that uses the machine learning algorithms 112 to learn the viewing trends of the user 118. Further details on how the customized parental control rules 110 are generated are discussed in further details below.

In one embodiment, the machine learning algorithms 112 may be executed by a machine learning model (MLM) (or machine learning (ML)-based model). In one embodiment, the MLM or ML may comprise the one or more machine learning algorithms 112 that have been "trained" or configured in accordance with input data (e.g., training data) to perform a particular service, e.g., to detect speech or other utterances in audio content, to identify words and phrases in speech and to convert to text, to identify intents and entities in natural language, and so forth. Examples of the present disclosure are not limited to any particular type of MLA/ model, but are broadly applicable to various types of MLAs/ models that utilize training data, such as support vector machines (SVMs), e.g., linear or non-linear binary classifiers, multi-class classifiers, deep learning algorithms/models, such as deep neural networks (DNNs), decision tree algorithms/models, k-nearest neighbor (KNN) clustering algorithms/models, hidden Markov models (HMMs), conditional random fields (CRF) models, generative adversarial networks (GANs), and so forth.

Although the core network 102 has been simplified for ease of explanation in FIG. 1, it should be noted that the core network 102 may include additional components that are not shown. For example, the core network 102 may combine core network components of a cellular network with components of a triple play service network; where triple play services include telephone services, Internet services and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise a broadcast television network, e.g., a traditional cable provider network or an Internet Protocol Television (IPTV) network, as well as an Internet Service Provider (ISP) network.

The core network 102 may include network elements that may serve as gateway servers or edge routers to interconnect the core network 102 with other networks (e.g., the home network 114, the Internet, wireless access networks, other types of access network, and so forth). The core network 102 may also include other types of servers, such as for example, a plurality of television (TV) servers, a plurality of content servers, a plurality of application servers, an advertising server, and the like.

In one embodiment, the endpoint device 116 in the home network 114 may be communicatively coupled to the AS 104 in the core network 102 to access the media content 108. The home network 114 may be connected to the core network 102 via an access network. For example, the access network may be a Digital Subscriber Line (DSL) network, a broadband cable access network, a Local Area Network (LAN), a cellular or wireless access network, a $3^{rd}$ party network, and the like. For example, the operator of core network 102 may provide a cable television service, an IPTV service, or any other type of television service to subscribers via the access network. In this regard, access network may include a node, e.g., a mini-fiber node (MFN), a video-ready access device (VRAD) or the like. However, in another example node may be omitted, e.g., for fiber-to-the-premises (FTTP) installations. The access network may also transmit and receive communications between the home network 114 and core network 102 relating to voice telephone calls, communications with web servers, and so forth.

Alternatively, or in addition, the network 100 may provide television services to home network 114 via satellite broadcast. For instance, a ground station may receive television content from television servers in the core network 102 for uplink transmission to a satellite. Accordingly, the satellite may receive television content from the ground station and may broadcast the television content to a satellite receiver, e.g., a satellite link terrestrial antenna (including satellite dishes and antennas for downlink communications, or for both downlink and uplink communications), as well as to satellite receivers of other subscribers within a coverage area of the satellite. In one example, the satellite may be controlled and/or operated by a same network service provider as the core network 102. In another example, the satellite may be controlled and/or operated by a different entity and may carry television broadcast signals on behalf of the core network 102.

In one embodiment, the home network 114 may include a home gateway (not shown), which receives data/communication associated with different types of media (e.g., the media content 108). The home gateway may transmit data to various endpoint devices connected to the home gateway in the home network 114. The endpoint device 116 may then receive the data from the core network 102 via the home gateway.

In one embodiment, the endpoint device 116 may be any type of device that can consume the media content 108. For example, the endpoint device 116 may be a set top box, a network connected television set, a laptop computer, a desktop computer, a tablet computer, a mobile telephone, and the like.

In one embodiment, the user 118 may select a media content 108 stored in the DB 106 via the endpoint device 116. The AS 104 may access the customized parental control rules 110 associated with the user 118 and apply the customized parental control rules 110 on the media content 108 that is selected. One or more scenes in the media content 108 may trigger a parental control associated with the customized parental control rules 110. As a result, the AS 104 may present a notification on the endpoint device 116 that the selected media content 108 has triggered a parental control associated with the customized parental control rules 110. The notification may ask the user 118 to confirm that the parental control should be executed or may provide the option to selectively ignore the parental control, e.g., on a temporary basis (e.g., a parent may be watching the media content 108 at night without children).

When the user 118 confirms the execution of the parental control, the AS 104 may execute the parental control on the selected media content 108. In one embodiment, the execution of the parental control may generate a modified content 120. For example, the modified content 120 may remove scenes and customize the media content 108 in accordance with the customized parent control rules 110. In other words, two different users 118 may select the same media content 108, but received two different versions of the same media content 108 in accordance with his or her respective customized parental control rules 110.

In another embodiment, the modified content 120 may include added notifications or triggers within the media content 108 based on the customized parental control rules 110. For example, when the modified content 120 is played on the endpoint device 116, the modified content 120 may automatically pause and present a notification that is associated with the modified content to ask the user 118 if the parental control should be executed (e.g., fast forwarding a scene). The user 118 may confirm and the scene may be skipped. As the modified content 120 continues to play, the modified content 120 may be automatically paused and additional notifications that were inserted in accordance with the customized parental control rules 110 may be presented to the user 118.

In one embodiment, the modified content 120 may be generated at the endpoint device 116 of the user 118. For example, the selected media content 108 may be transmitted to the endpoint device 116 and the endpoint device 116 may perform the modification based on the customized parental control rules 110 received from the AS 104. The endpoint device 116 may then encode the modified content 120 for playback.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 102 is not limited to an IMS network. Similarly, the present disclosure is not limited to an IP/MPLS network for VoIP telephony services, or any particular type of broadcast television network for providing television services, and so forth.

Figure 2:
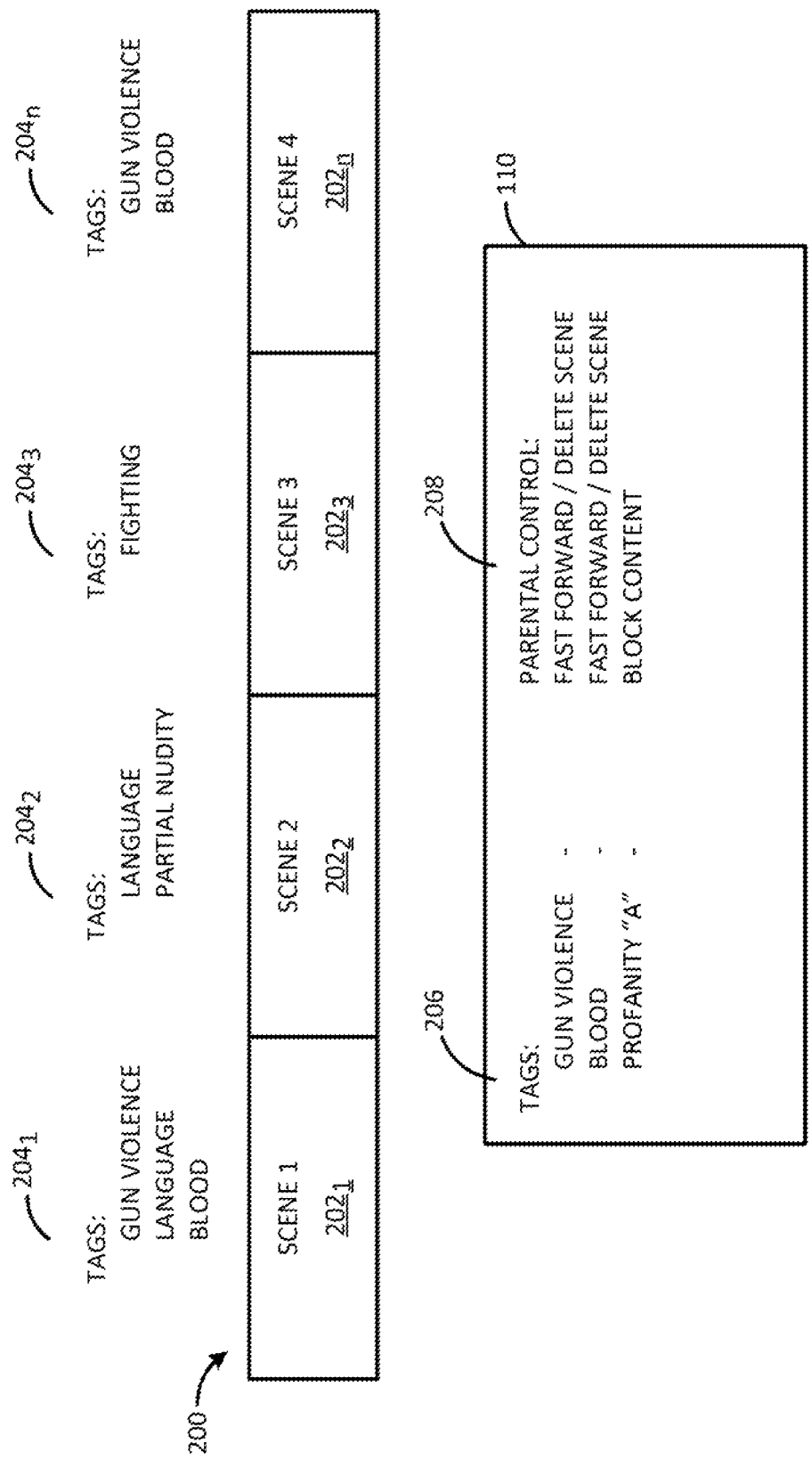
FIG. 2 illustrates an example of generating customized parental control rules that may be applied to an example timeline of content.

FIG. 2 illustrates an example of generating customized parental control rules 110 that may be applied to an example timeline of the media content 108. As noted above, the customized parental control rules 110 may be generated during a training time period (e.g., several days, several weeks, and the like) or a pre-defined number of media content 108 (e.g., at least 50 movies and/or television shows).

In one embodiment, the media content 108 may be content that is managed by a service provider of the core network 102 or on a third party site. As a result, the media content 108 may be categorized and tagged. For example, each scene of the media content 108 may be tagged with various descriptions. A time frame may be associated with each scene of the media content 108 and each scene may be tagged with descriptions to describe what type of information is in the scene.

FIG. 2 illustrates an example timeline 200 of a media content. The timeline 200 may include a plurality of scenes $202_1$ to $202_n$ (hereinafter also referred to individually as a scene 202 or collectively as scenes 202). Each scene 202 may be defined by a start time and an end time having a plurality of frames. Each scene $202_1$ to $202_n$ may include respective tags $204_1$ to $204_n$ (hereinafter also referred to individually as a tag 204 or collectively as tags 204). The tags 204 may include terms or descriptions that describe what type of content is within a respective scene 202.

In one embodiment, the present disclosure may allow the user to more granular descriptions. Current descriptors of content may use general broad terms such as "violence" or "language." However, there may be different types of violence. Some types of violence may be acceptable to the user 118, while other types of violence may not be acceptable to the user 118. For example, within the tag 204 of "violence" there may be "gun violence," "sword violence," "fist fighting violence," "karate violence," and the like. In addition, within each sub category of violence, there may be further tags 204. For example, within "gun violence" there may be further sublevel descriptions such as "blood," "bullet exit wounds," "close up execution," "assault rifles," and the like. Thus, more granular tags 204 may be associated with user inputs that are performed when learning the customized parental control rules 110.

In one embodiment, a training process may be implemented by the AS 104 via the machine learning algorithms 112 during a training time period to generate the customized parental control rules 110. In one embodiment, the machine learning algorithms 112 may receive inputs from the user 118 during the training time period as the media content 108 is being consumed to learn viewing trends of the user 118. As noted above, each media content 108 may be tagged scene-by-scene. The viewing trends may associate a user input with at least one tag 204 associated with different scenes 202 of the media content 108. In one embodiment, the input may be a fast forward action and/or a muting of the audio action. For example, as the user 118 is watching the scene $202_2$ the user 118 may fast forward to the beginning of scene $202_3$. The machine learning algorithm 112 may correlate the tags 204 that may be common to the scenes 202 that were skipped by the user 118.

In one embodiment, the input may include a pause action, a stop playback action, an audio input, a video input and the like. For example, instead of fast forwarding, the user may pause or stop the media content 108. In another example, the endpoint 116 may collect audio and/or video of the users 118. The user 118 may opt in to allow audio and video data to be collected. Thus, in one example with the subscriber's prior consent, the audio and/or video may be analyzed by the machine learning algorithms 112 to correlate any reactions, words or facial expressions that may indicate that the user 118 did not approve of a scene 202. Thus, in one example, the machine learning algorithms 112 may use language detection models to analyze the audio and facial detection models to analyze the video of the viewing audience.

In one embodiment, the machine learning algorithms 112 may prompt the user whenever an input is detected to confirm that the input was due to content shown in the scenes 202. For example, the user 118 may pause or stop a movie because the user 118 had to leave to get a snack or answer a phone call. The user 118 may fast forward scenes because the user 118 is bored with portions of the movie or just trying to get to a scene the user 118 enjoys. Thus, the prompt may be shown during the training period to confirm that the input was due to undesirable content in a scene 202 and reduce the possibility of false positives.

In one embodiment, the prompts may allow the tags 204 to be user defined. For example, the broad description "language" may try to capture profanity. However, what is considered profanity may change over time. Also, what is considered profanity may be different for different users 118. In one embodiment, tags 204 may be user defined during the training process. For example, the scene $202_3$ may be fast forwarded by a user during a training process. The machine learning algorithms 112 may request some more information from the user 118 regarding why the scene $202_3$ was skipped, as noted above. The user 118 may indicate that the term "dumb" was used in the scene $202_3$. Although the term "dumb" may not be included in the broad category of "language," the additional information from the user 118 may allow the customized parental control rules 110 to include the term "dumb" to be applied to future media content. Thus, the tags $204_3$ for the scene $202_3$ may be updated to include the term "dumb." In one embodiment, the media content 108 may be analyzed to search for the term "dumb" and include the term "dumb" in tags 204 that may be found in other scenes 202.

After the training period is completed, the machine learning algorithms 112 may generate the customized parental control rules 110. The customized parental control rules 110 may include a tag 206 and a parental control 208. For example, each tag 206 may be associated with a parental control 208. To illustrate, the tag "gun violence" may be associated with the parental control "fast forward or delete scene." Other types of parental control may include blocking playback of the entire media content 108 (e.g., when the media content 108 is selected, the customized parental control rules 110 may be applied to prevent playback of the selected media content 108), blocking a portion of the media content, fast forwarding a portion of the media content, muting a portion of the media content, and the like.

The parental control that is executed may depend on how the media content 108 is controlled. As discussed in further details below, the media content 108 may be modified to delete the scenes so the user 118 does not see the scenes during playback. In another embodiment, notifications may be inserted throughout the media content 108 that are triggered by the tags 206 in the customized parental control rules 110. The notifications may automatically pause the playback of the media content 108 and provide an option to user 118 to execute the parental control or ignore the parental control (e.g., the user 118 may be watching the media 108 at night without his or her children). In one alternative embodiment, the notification may be a visual and/or an audio cue that such a scene is approaching while the user is still watching the media content (e.g., a flashing icon on the screen, or an audio tone is presented, and so on) so that the user can react to the notification without having to pause the presentation of the media content.

In one embodiment, the customized parental control rules 110 may be applied to the media content 108 before the media content 108 is encoded for transmission. For example, the media content 108 may be modified to delete scenes to generate the modified content 120 or modified to insert notifications to execute parental controls that are triggered by the tags 206 in the customized parental control rules 110. The modified content 120 may then be encoded based on the type of playback encoding used by the endpoint device 116. The modified content 120 that is encoded may then be transmitted to the endpoint device 116 for playback.

In one embodiment, the media content 108 may be analyzed as the media content 108 is encoded and streamed to the endpoint device 116. For example, a buffer may be used to encode and analyze the media content 108 in accordance with the customized parental control rules. The media content 108 may be buffered to allow enough time for the parental control to be applied to a scene before the scene is played back to the user 118. Thus, the notifications may be inserted into the media content 108 at points where the customized parental control rules may trigger a parental control as the user 118 is watching the media content 108.

In one embodiment, new inputs may be observed as the user 118 is watching the media content 108. For example, as children get older the user 118 may ignore some notifications to execute parental control. Thus, the machine learning algorithms 112 may continuously analyze the inputs from the user 118 even after the training time period to update the customized parental control rules 110 on a continual basis. The machine learning algorithms 112 may over time delete some tags 206 from the customized parental control rules 110 based on parental controls that are ignored.

In another example, the user may fast forward scenes that are associated with tags that were not included in the customized parental control rules 110. Thus, the machine learning algorithms 112 may update the customized parental control rules 110 to include new tags 206 with associated parental controls 208 over time. In other words, after the customized parental control rules 110 are initially generated, the customized parental control rules 110 may be dynamically modified over time as the machine learning algorithms 112 learn new viewing trends of the user 118.

Figure 3:
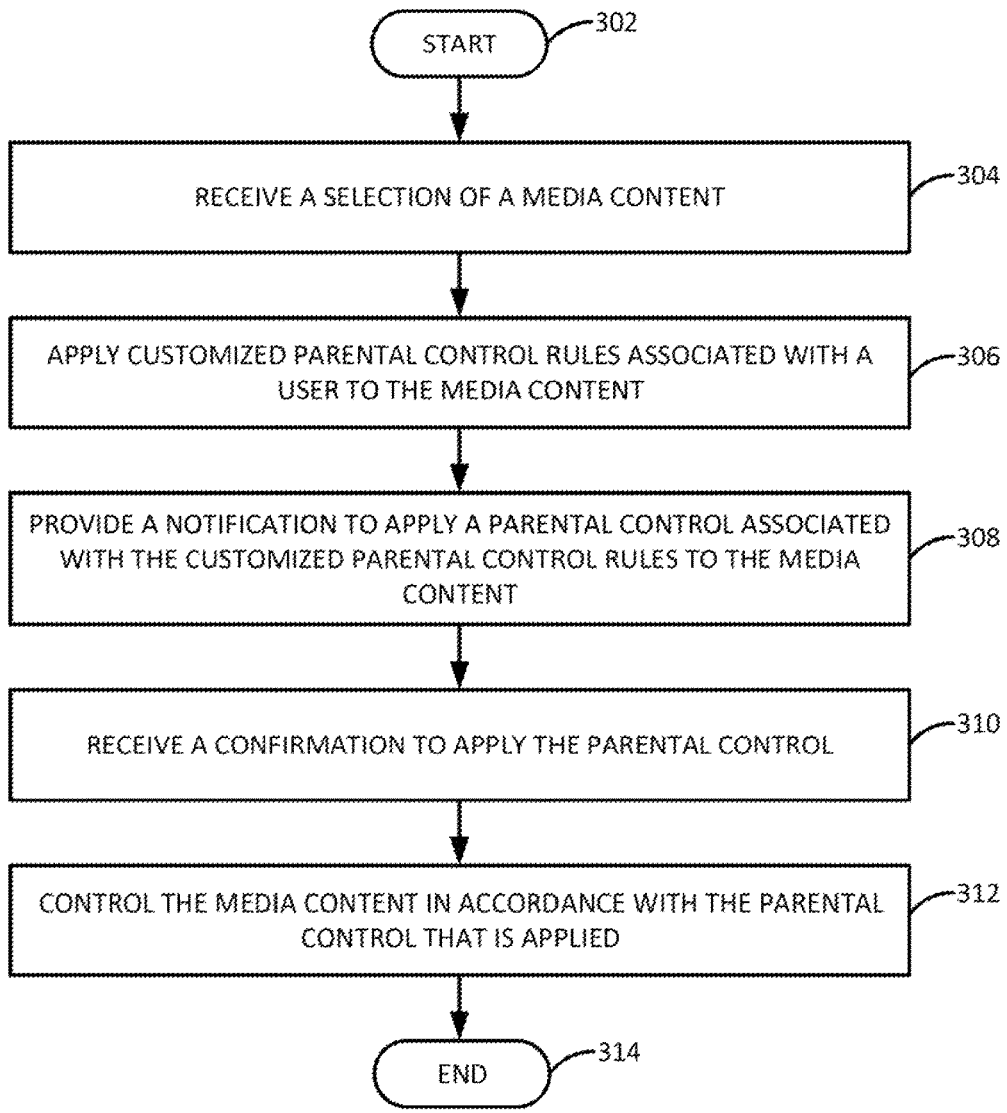
FIG. 3 illustrates a flowchart of an example method for providing automated parental controls on content, in accordance with the present disclosure.

FIG. 3 illustrates a flowchart of an example method 300 for providing automated parental controls on content, in accordance with the present disclosure. In one example, steps, functions and/or operations of the method 300 may be performed by the AS 104 as illustrated in FIG. 1. In one example, the steps, functions, or operations of method 300 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 300 is described in greater detail below in connection with an example performed by a processing system, such as processing system 402.

The method 300 begins in step 302. In step 304, the processing system may receive a selection of a media content. For example, a service provider may provide media content that can be streamed over the Internet or downloaded for local consumption. A user may use an endpoint device (e.g., a set top box, a mobile device, a desktop computer, a smart television, a streaming device, and the like) to select media content for selection. The media content may be a movie, a television program, an audio program, music, and the like.

In step 306, the processing system may apply customized parental control rules associated with a user to the media content. The customized parental control rules may be generated using machine learning algorithms during a training period, as described above. The media content may be tagged and user inputs may be monitored during the training period. The machine learning algorithms may analyze the tags for each scene and the user inputs that are received to learn viewing trends of the user. In one embodiment, the user inputs may include a fast forward action, a pause action, a stop playback action, an audio muting action, an audio input, a video input, and the like.

In one embodiment, the customized parental control rules may include tags and at least one associated parental control. Thus, when the customized parental control rules are applied to media content, the media content may be analyzed for tags that match a tag in the customized parental control rules. If a match is found, then the associated parental control may be executed.

In one embodiment, the customized parental control rules may be applied to the media content before the media content is encoded. The customized parental control rules may be applied to generate modified media content. For example, the media content may be modified to delete scenes that contain tags that trigger the parental controls in the customized parental control rules. In another example, notifications may be inserted into the media content at scenes that trigger the parental controls in the customized parental control rules.

In one embodiment, the media content may be buffered as the media content is streamed. The buffering may allow the media content to be analyzed in accordance with the customized parental control rules as the media content is playing on the endpoint device. When a parental control in the customized parental control rules is triggered due to matching tags in a scene of the media content, the media content may be paused to provide a notification to the user, thereby allowing the user an opportunity to control the presentation of the media content in real time.

In step 308, the processing system may provide a notification to apply a parental control associated with the customized parental control rules to the media content. The notification may allow a user to override a parental control or accept the parental control that is to be automatically applied. For example, a user may be watching media content at night without any children present and want the media content to be played unmodified in its original form.

In one embodiment, the notification may be provided before the media content is encoded for playback. For example, the notification may indicate that the media content may be blocked or inaccessible based on the customized parental control rules. The notification may allow a user to ignore the block action. For example, a user code may be entered to override the parental control to block the media content.

In one embodiment, the notification may be provided during playback of the media content. For example, the notifications may be inserted into the modified media content or may be presented as the media content is being played. In either case, the notification may provide the user an option to accept the parental control or override the parental control (e.g., using a passcode).

In step 310, the processing system may receive a confirmation to apply the parental control. The user may confirm the parental control presented in the notification. In one embodiment, no response may be a confirmation to apply the parental control.

In step 312, the processing system may control the media content in accordance with the parental control that is applied. In response to the confirmation, the parental control may be applied to the media content. In one embodiment, the parental control may be blocking playback of the media content, blocking a portion of the media content, fast forwarding a portion of the media content, and the like.

In one embodiment, after the training period ends, the inputs received during playback of additional media content may be used to continuously update the customized parental control rules. For example, as children grow older the parents may allow the children to watch more adult themed scenes (e.g., more violence, more language, more romantic scenes, and the like). As a result, the user may begin skipping some of the parental controls. The machine learning algorithms may analyze the tags associated with scenes that the parental controls are overridden or ignored. The machine learning algorithms may then remove the identified tags associated parental controls from the customized parental control rules. As a result, over time notifications for scenes with the identified tags may be removed from subsequently selected media content. In step 314, the method 300 ends.

It should be noted that the method 300 may be expanded to include additional steps or may be modified to include additional operations with respect to the steps outlined above. In addition, although not specifically specified, one or more steps, functions, or operations of the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Figure 4:
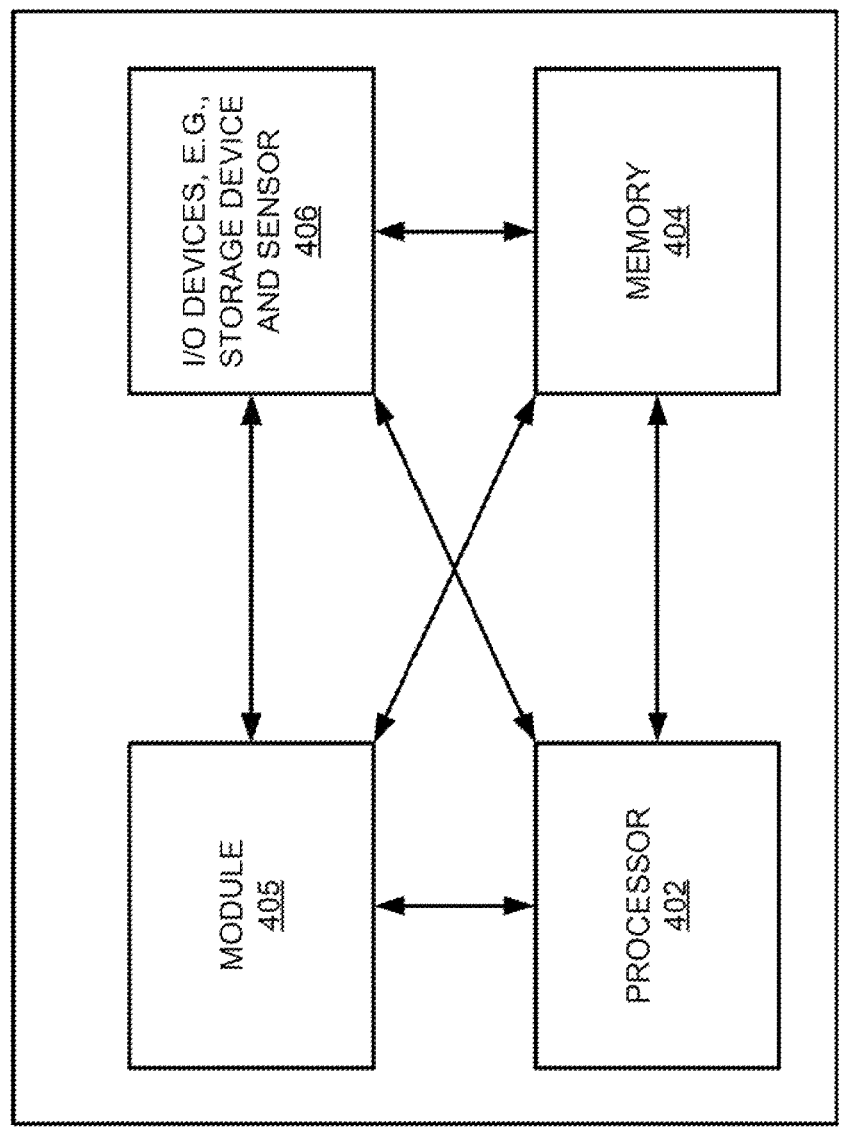
FIG. 4 illustrates an example of a computing device, or computing system, specifically programmed to perform the steps, functions, blocks, and/or operations described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for providing automated parental controls on content, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300 or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for providing automated parental controls on content (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for providing automated parental controls on content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

generating, by a processing system including at least one processor, an initial set of customized parental control rules for a user, the initial set of customized parental control rules generated based on user input, the user input responsive to the user consuming scenes of training media content during a training period, wherein each respective scene of the scenes is associated with a respective tag provided by a source of the training media content, wherein each respective tag describes a type of content within the respective scene, and wherein the initial set of customized parental control rules is associated with at least one tag via the user input;

receiving, by the processing system after conclusion of the training period, a selection of a media content, wherein the media content comprises a plurality of scenes, wherein at least one scene of the plurality of scenes of the media content is associated with at least one tag provided by a source of the media content, and wherein the at least one tag describes a type of content within the at least one scene of the plurality of scenes of the media content;

applying, by the processing system, the initial set of customized parental control rules associated with the user to the media content;

providing, by the processing system, a notification that a parental control associated with the initial set of customized parental control rules will be applied to the media content to generate a customized media content when the at least one tag associated with the initial set of customized parental control rules matches the at least one tag associated with the at least one scene of the plurality of scenes of the media content;

receiving, by the processing system, a confirmation to apply the parental control to generate the customized media content; and controlling, by the processing system, the media content in accordance with the parental control that is applied to generate the customized media content.

2. The method of claim 1, wherein the applying is performed before the media content is encoded for playback on an endpoint device.

3. The method of claim 1, wherein the generating comprises applying a machine learning algorithm that learns viewing trends of the user based on the user input.

4. The method of claim 3, wherein the viewing trends comprise at least one respective user input associated with at least one respective tag associated with at least one respective scene of the scenes of the training media content.

5. The method of claim 4, wherein the at least one respective user input comprises a fast forward action, a pause action, a stop playback action, an audio muting action, an audio input, or a video input.

6. The method of claim 1, wherein the parental control comprises at least one of: blocking playback of a portion of the media content, or fast forwarding a portion of the media content.

7. The method of claim 1, wherein the controlling comprises:

modifying, by the processing system, the media content to remove a portion of the media content in accordance with the parental control of the initial set of customized parental control rules to create the customized media content for the user; and transmitting, by the processing system, the customized media content to an endpoint device of the user.

8. The method of claim 1, wherein the applying comprises:

buffering, by the processing system, at least a portion of the media content during playback of the media content; and inserting, by the processing system, the notification into the at least the portion of the media content at one or more points where the initial set of customized parental control rules trigger the parental control.

9. The method of claim 8, wherein the providing is performed at the one or more points wherein the notification is inserted during playback of the media content.

10. The method of claim 9, wherein the parental control comprises fast forwarding a scene of the media content.

11. The method of claim 1, further comprising:

detecting, by the processing system and after conclusion of the training period, an input from the user responsive to playback of the media content;

confirming, by the processing system, that the input was due to undesirable content in the media content; and updating, by the processing system, the initial set of customized parental control rules to create an updated set of customized parental control rules based on the input from the user responsive to playback of the media content, and wherein the updated set of customized parental control rules is subsequently used by the applying and the providing in place of the initial set of customized parental control rules.

12. The method of claim 1, wherein the media content comprises video that is streamed to an endpoint device of the user.

13. The method of claim 1, wherein the media content is selected from a plurality of media content that is provided by a service provider, wherein each one of the plurality of media content is tagged.

14. A non-transitory computer-readable medium storing instructions which, when executed by a processing system including at least one processor, cause the processing system to perform operations, the operations comprising:

generating an initial set of customized parental control rules for a user, the initial set of customized parental control rules generated based on user input, the user input responsive to the user consuming scenes of training media content during a training period, wherein each respective scene of the scenes is associated with a respective tag provided by a source of the training media content, wherein each respective tag describes a type of content within the respective scene, and wherein the initial set of customized parental control rules is associated with at least one tag via the user input;

receiving, after conclusion of the training period, a selection of a media content, wherein the media content comprises a plurality of scenes, wherein at least one scene of the plurality of scenes of the media content is associated with at least one tag provided by a source of the media content, and wherein the at least one tag describes a type of content within the at least one scene of the plurality of scenes of the media content;

applying the initial set of customized parental control rules associated with the user to the media content;

providing a notification that a parental control associated with the initial set of customized parental control rules will be applied to the media content to generate a customized media content when the at least one tag associated with the initial set of customized parental control rules matches the at least one tag associated with the at least one scene of the plurality of scenes of the media content;

receiving a confirmation to apply the parental control to generate the customized media content; and controlling the media content in accordance with the parental control that is applied to generate the customized media content.

15. The non-transitory computer-readable medium of claim 14, wherein the applying is performed before the media content is encoded for playback on an endpoint device.

16. The non-transitory computer-readable medium of claim 14, wherein the generating comprises applying a machine learning algorithm that learns viewing trends of the user based on the user input.

17. The non-transitory computer-readable medium of claim 16, wherein the viewing trends comprise at least one respective user input associated with at least one respective tag associated with at least one respective scene of the scenes of the training media content.

18. The non-transitory computer-readable medium of claim 17, wherein the at least one respective user input comprises a fast forward action, a pause action, a stop playback action, an audio muting action, an audio input, or a video input.

19. The non-transitory computer-readable medium of claim 14, wherein the parental control comprises at least one of: blocking playback of a portion of the media content, or fast forwarding a portion of the media content.

20. A device comprising:
- a processing system including at least one processor; and
- a non-transitory computer-readable medium storing instructions which, when executed by the processing system, cause the processing system to perform operations, the operations comprising:
  - generating an initial set of customized parental control rules for a user, the initial set of customized parental control rules generated based on user input, the user input responsive to the user consuming scenes of training media content during a training period, wherein each respective scene of the scenes is associated with a respective tag provided by a source of the training media content, wherein each respective tag describes a type of content within the respective scene, and wherein the initial set of customized parental control rules is associated with at least one tag via the user input;
  - receiving, after conclusion of the training period, a selection of a media content, wherein the media content comprises a plurality of scenes, wherein at least one scene of the plurality of scenes of the media content is associated with at least one tag provided by a source of the media content, and wherein the at least one tap describes a type of content within the at least one scene of the plurality of scenes of the media content;
  - applying the initial set of customized parental control rules associated with the user to the media content;
  - providing a notification that a parental control associated with the initial set of customized parental control rules will be applied to the media content to generate a customized media content when the at least one tag associated with the initial set of customized parental control rules matches the at least one tag associated with the at least one scene of the plurality of scenes of the media content;
  - receiving a confirmation to apply the parental control to generate the customized media content; and
  - controlling the media content in accordance with the parental control that is applied to generate the customized media content.

\* \* \* \* \*